United States Patent [19]
Heo

[11] Patent Number: 5,400,388
[45] Date of Patent: Mar. 21, 1995

[54] CIRCUIT AND METHOD FOR OPERATING A RADIO TELEPHONE UPON LOSS OF AC POWER

[75] Inventor: Joo-Won Heo, Kumi, Rep. of Korea

[73] Assignee: SamSung Electronics Co., Ltd., Suwon, Rep. of Korea

[21] Appl. No.: 813,603

[22] Filed: Dec. 26, 1991

[30] Foreign Application Priority Data

Apr. 23, 1991 [KR] Rep. of Korea .................. 1991-6512

[51] Int. Cl.$^6$ .......................................... H04M 11/00
[52] U.S. Cl. .......................................... 379/58; 379/61
[58] Field of Search ................ 379/58, 61, 63, 162, 379/163, 374, 393, 413, 387, 412; 455/38.3, 127, 343

[56] References Cited

U.S. PATENT DOCUMENTS

| | | | |
|---|---|---|---|
| 4,238,644 | 12/1980 | Dijkmans et al. | 379/413 |
| 4,847,899 | 7/1989 | Hikida | 379/387 |
| 4,876,708 | 10/1989 | Saegosa et al. | 379/162 |
| 5,003,587 | 3/1991 | Forbes | 379/162 |

FOREIGN PATENT DOCUMENTS

| | | | |
|---|---|---|---|
| 0199242 | 10/1985 | Japan | 379/61 |
| 0297941 | 12/1989 | Japan | 379/374 |
| 0023755 | 1/1990 | Japan | 379/61 |
| 0095056 | 4/1990 | Japan | 379/61 |

Primary Examiner—Curtis Kuntz
Assistant Examiner—Dwayne D. Bost
Attorney, Agent, or Firm—Robert E. Bushnell

[57] ABSTRACT

A circuit for preventing a radio telephone engaged in a call from being cut off when a power failure occurs, wherein the radio telephone is branched with a wire telephone by a telephone line. When the power is off while engaged in a call, the telephone line is held on by a state of a line voltage and a music on hold is generated. If power turns on again in a holding state, a power off cancel data is transmitted to a portable device. If a response data from the portable device is received, the holding state of the telephone line is canceled and the music on hold is stopped, and the call through the radio telephone is connected again. If the power is not on again or if the response data is not received, it is checked during a given time whether the wire telephone is hooked off or not. If the wire telephone is hooked off or if the given time has passed, the holding state of the telephone line is canceled and the music on hold is stopped. Therefore, the telephone call is continued even when a power failure occurs on an engaged state in the call.

22 Claims, 2 Drawing Sheets

CIRCUIT AND METHOD FOR OPERATING A RADIO TELEPHONE UPON LOSS OF AC POWER

BACKGROUND OF THE INVENTION

The present invention relates to a circuit and a method for operating a radio telephone in spite of a power failure, and more particularly to a circuit and a method for operating a radio telephone branched with a wire telephone by a telephone line even when a power failure occurs during an engaged state in a call.

In general, a wire telephone is operated by a voltage of −48 V served from a switching system, while a radio telephone requires an additional voltage to be supplied, so that the radio telephone has a power supply device for providing an operating voltage. The power supply device supplies only a direct current (dc) voltage to the radio telephone by dropping an alternating current (ac) voltage of 110 V or 220 V to a given voltage and rectifying the dropped voltage. The dc voltage from the power supply device is used as an operating voltage source for all of the circuits in a fixed device of the radio telephone and as a charging and operating voltage source of a portable device of the radio telephone. An adapter is generally used for the power supply device.

A conventional radio telephone operated by a dc voltage from an adapter, however, has a problem that a telephone line engaged in a call is cut off when a power failure occurs during the call.

To solve the above problem, there is a method of installing a charging device like a storage battery or a capacitor in a fixed device or an adapter of a radio telephone in order to supply a dc voltage to the radio telephone when a power failure occurs, the charging device being charged while power is normally supplied. But this method also has a problem that the volume and the cost of the radio telephone are increased.

Another method is branching a wire telephone with a radio telephone by a telephone line so that a call can be made through the wire telephone in case of a power failure of the radio telephone. However if a power failure occurs while a party is engaged in a call through the radio telephone, the call is not switched into the wire telephone but cut off immediately.

SUMMARY OF THE INVENTION

Accordingly, an object of the present invention is to provide a circuit and a method for operating a radio telephone branched with a wire telephone by a telephone line in order to maintain a telephone call even when a power failure occurs during an engaged state in the call.

Another object of the present invention is to provide a circuit and a method for operating a radio telephone branched with a wire telephone by a telephone line when a power failure occurs during an engaged state in the call, wherein the telephone line engaged in the call is held on by sensing a power failure and then the call is switched into the wire telephone.

Still another object of the present invention is to provide a circuit and a method for operating a radio telephone branched with a wire telephone by a telephone line when a power failure occurs during an engaged state in the call, wherein the telephone line engaged in a call is held on by a line supply voltage and then the call is switched into the wire telephone if a hook off signal from the wire telephone is sensed by a variation of the line supply voltage.

In order to achieve the above objects of the present invention, a fixed device circuit of a radio telephone includes a line controller connected to a telephone line for interfacing an input/output signal of the telephone line and controlling connection of a telephone call by a given control, a music-on-hold (MOH) generator for generating a MOH based on a given control, a communication circuit for processing an input/output audio signal from the telephone line through the line controller and transmitting the MOH from the MOH generator to the telephone line through the line controller and a speaker SPK, a radio communication circuit connected to the communication circuit for processing signals based on a given control for communicating with a portable device by radio contact, a hook off sensor for sensing a hook off signal from a wire telephone (not figured) branched with the telephone line by a variation of a supply voltage on the telephone line, a main controller for controlling the line controller, the MOH generator and the radio communication circuit based sensing the hook off signal from the hook off sensor and/or power failure from an input state of a first supply voltage in order to control holding on/off, a supply voltage generator for generating a first supply voltage by dropping an ac voltage to a given voltage and rectifying the dropped voltage, a rectifier for generating a second supply voltage by rectifying the voltage from the telephone line, a first voltage controller for supplying the line controller, the MOH generator, the communication circuit, the hook off sensor and the main controller with the first supply voltage in Case of power on or with the second supply voltage in case of power off, as an operating voltage, a second voltage controller for supplying the radio communication circuit with the first supply voltage as an operating voltage source. Generally, a one chip microprocessor is used for said main controller.

In order to achieve the above objects of the present invention, an inventive method includes the steps of checking whether power is off while engaged in a call, holding a telephone line engaged in the call and generating a music on hold when the power is off, checking whether the power is on again or not during a holding state of the call, transmitting a hold off data to a portable device if power is on again, canceling the holding state and stopping the music on hold if a response data from the portable device is received, and then going to the first step of checking if the power is off, checking off of the wire telephone during a given time if power is not on again or if the hold off data is not received, and canceling the holding state and stopping the music on hold if the wire telephone is hooked off or if a given time has passed.

BRIEF DESCRIPTION OF THE DRAWINGS

For a better understanding of the invention and to show how the same may be carried into effect, reference will now be made, by way of example, to the accompanying diagrammatic drawings, in which.

DESCRIPTION OF THE PREFERRED EMBODIMENTS

Figure 1:
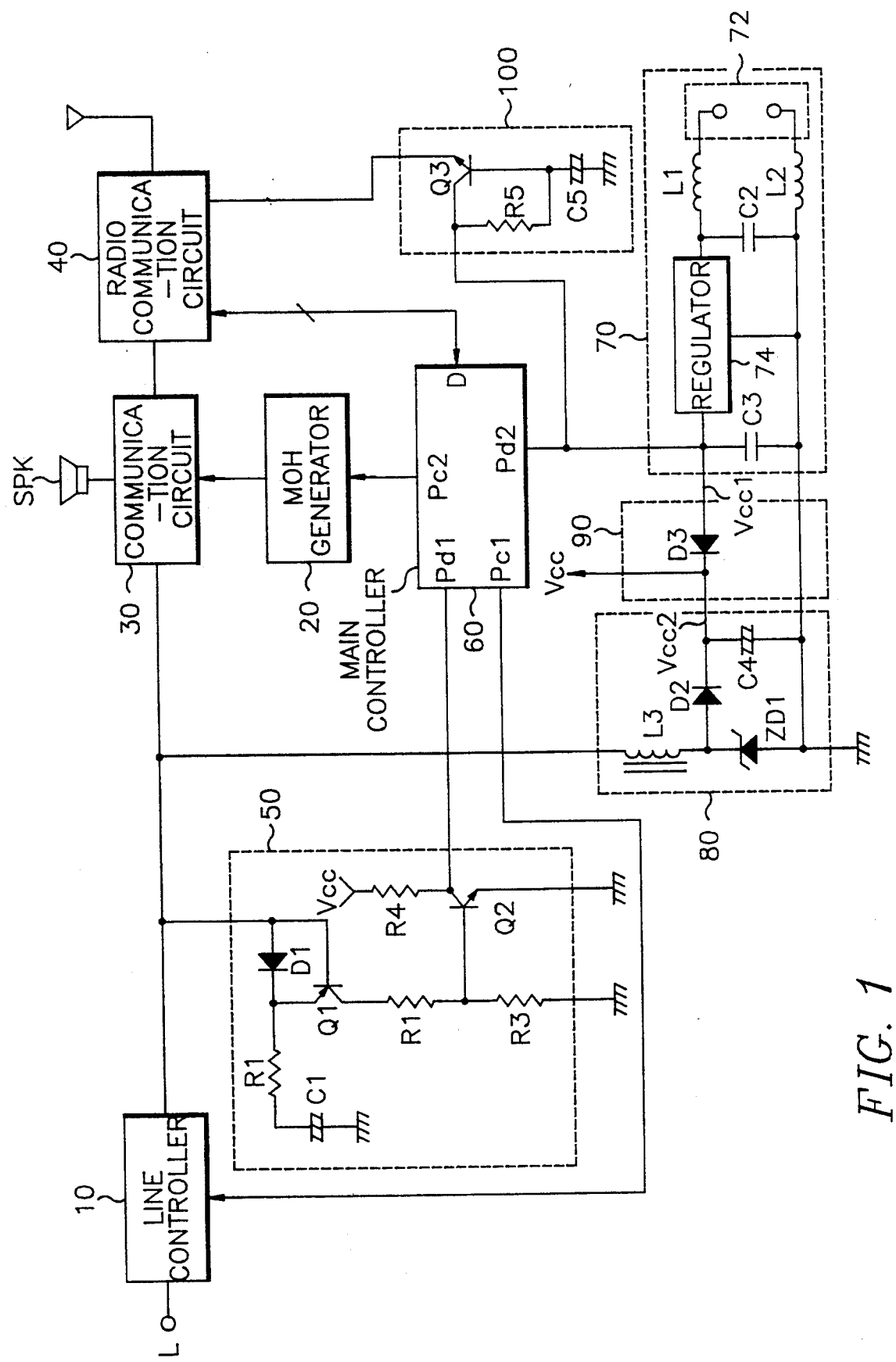
FIG. 1 shows a circuit of a fixed device of a radio telephone according to the present invention.

Referring to FIG. 1, communication between a fixed device and a portable device is performed by radio contact made through a radio communication circuit 40.

An operation of the circuit shown in FIG. 1 will be described as follows. In a hook on state, that is, if not engaged in a call, an ac voltage, normally inputted to the supply voltage generator 70 through a power supply jack 72 is dropped to a given voltage and rectified at a regulator 74 after passing through coils L1, L2 and a capacitor C2, and thereby a first dc supply voltage Vcc1 is generated. A MC7806 of Samsung Co. in Korea can be used as the regulator 74 whose output voltage is 6 V. The first supply voltage Vcc1 is supplied to a line controller 10, MOH generator 20, a communication circuit 30, a hook off sensor 50 and a main controller 60 as an operating voltage, through a diode D3. At the same time, the first supply voltage Vcc1 is also supplied in a high state to a voltage sensing terminal Pd2 of the main controller 60 as well as the radio communication circuit 40 through the second voltage controller 100, comprising a transistor Q3. Under the above condition, if a call from the outside is on the telephone line L or dialing to the outside is done, that is, if engaged in a call, a line voltage −48 V, from switching system supplied to the telephone line L as a telephone supply voltage is inputted via the controller 10. An ac component of the line voltage, e.g., a sound signal, is cut off by the rectifier 80 through a choke coil L3 and rectified by a diode D2 and a capacitor C4, thus the second dc supply voltage Vcc2 is generated. A Zener diode ZD1, used for constantly maintaining the second supply voltage Vcc2, has a Zener voltage of 5.1 V in the present invention. Therefore, the value of the second supply voltage Vcc2 is given by subtracting a voltage drop of the diode D2 from the Zener voltage of 5.1 V. At this time, since the second supply voltage Vcc2 is lower than the first supply voltage Vcc1, the first supply voltage Vcc1 is supplied to each part of the circuit of FIG. 1, by the first voltage controller 90, as the operating voltage source Vcc. This is achieved by setting up the first voltage Vcc1 higher than the second voltage Vcc2.

On the other hand, if the power is off while engaged in the call, the regulator 74 does not operate any more, so that the first supply voltage Vcc1 is equal to the grounding voltage. In this case, a low state signal is applied to the voltage sensing terminal Pd2 of the main controller 60 and a supply voltage is not supplied to the radio communication circuit 40. At this time, since the first supply voltage Vcc1 applied to an anode of the diode D3 is low state and the second supply voltage Vcc2 is applied to a cathode of the diode D3, the second supply voltage Vcc2 is supplied as the operating voltage source Vcc instead of the first supply voltage Vcc1.

Accordingly, the line controller 10, the MOH generator 20, the telephone circuit 30, the hold off sensor 50 and the main controller 60 continue their operations, while the radio communication circuit does not continue operation, even when the power is off during on an engaged-state in the call. Therefore, the telephone line L may be held on, because the telephone line engaged in the call is not cut off in spite of power-off. The main controller 60 senses whether the power is on or off with the state of the first supply voltage Vcc1 inputted to the voltage sensing terminal Pd2. If the power is off while engaged in the call, the main controller 60 senses power-off, holds on the telephone line L and turns on the MOH generator 20 through the MOH signal terminal Pc2 in order to generate the MOH. The MOH is applied to the communication circuit 30, and then transmitted to the telephone line L through the line controller 10 as well as a speaker of the fixed device to thereby inform the user that the telephone line L is in a holding state. The user continues the call through the wire telephone branched with the radio telephone by hooking off the wire telephone. When the wire telephone is hooked off, the line voltage on the telephone line L becomes low. The variation of the line voltage is sensed by the hook off sensor 50. The operation of the hook off sensor 50 sensing hook-off of the wire telephone by the variation of the line voltage will be described as follows.

When the user has the call through the radio telephone branched with the wire telephone, the line voltage via the line controller is charged on a capacitor C1 through a diode D1, while the wire telephone is hooked on. Therefore, transistors Q1, Q2 are turned off, and the operating voltage source Vcc of a high state is supplied to hold off sensing terminal Pd1 of the main controller 60. At this time, if the wire telephone is hooked off, the line voltage on the telephone line L becomes low. Therefore, the transistor Q1 is turned on, because the voltage on the base of the transistor Q1 is lower than the voltage on the emitter of the transistor Q1 which is supplied with the charging voltage of the capacitor C1. As the transistor Q1 is turned on, the transistor Q2 is turned on, so that a low state signal is applied to the hold off sensing terminal Pd1 of the main controller 60. Thus, the main controller 60 senses whether the wire telephone is hooked on or off while engaged in the call. Sensing a hook-off state of the wire telephone while the telephone line L is in a holding state and the MOH is generated, the main controller 60 stops the MOH by turning off the MOH generator 20 and controls the line controller 10 through the line control terminal Pc1 to cancel the holding state. On the other hand, if the power is on again in the holding state, the main controller 60 senses a power-on state by the first supply voltage Vcc1 supplied to the voltage sensing terminal Pd2 and transmits a power-off cancel data from a data terminal D to the portable device through the radio communication circuit 40. Receiving a response data from the portable device, the main controller 60 turns off the MOH generator 20 to stop the MOH. Therefore, the user can continue to communicate with the portable device again. Here, the power-off cancel data means and the response data means transmit and receive data, in order that the main controller 60 of the fixed device examines the state of the portable device when power is on again in the holding state.

Figure 2:
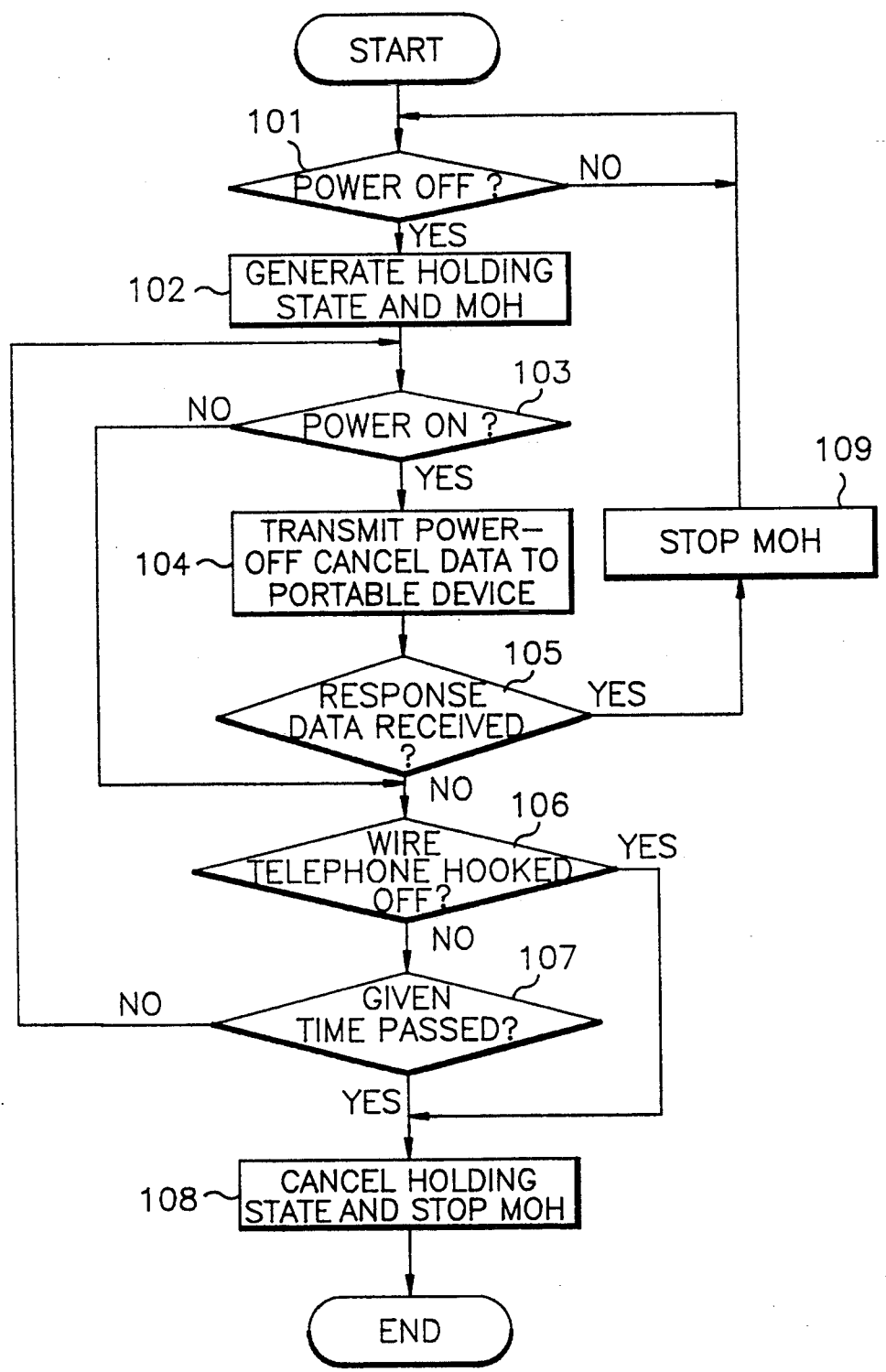
FIG. 2 shows a flowchart for operating a radio telephone upon a power failure according to the present invention.

The above described operation of the inventive circuit will be described with reference to FIG. 2 as follows. As described hereinabove, if a call from the outside is on the telephone line L or dialing to the outside is done (that is, if engaged in a call), the main controller 60 examines continuously the state of the first supply voltage Vcc1 applied to the voltage sensing terminal Pd2 in a step 101. If the first supply voltage Vcc1 of low state is applied to the voltage sensing terminal Pd2 due to power failure, power off is sensed in the step 101. In a step 102, the main controller 60 makes the telephone line L to be held on and turns on the MOH generator 20 to generate the MOH. The MOH is transmitted to the telephone line L as well as the speaker SPK, so that the user realizes that the telephone line L is a holding state due to a power failure. At this time, the main controller 60 maintains its operation by the second supply voltage Vcc2 supplied as the operating voltage. In a step 103, the main controller 60 examines an input of the voltage sensing terminal Pd2 in order to check whether power is on again or not. If power is on again, the main controller 60 transmits the power-off cancel data from the data terminal D to the portable device through the radio communication circuit 40 in a step 104. In a step 105, the main controller 60 checks whether the response data is received or not. If the response data is received to the data terminal D, the MOH is stopped by turning off the MOH generator 20 in a step 109, and then the program goes to the step 101. On the other hand, if power is not on again in the step 103, or if the response data from the portable device is not received to the data terminal D of the main controller 60 in the step 105, a step 106 is carried out. In the step 106, through the input state of the hook off sensing terminal Pd1, the main controller 60 checks whether the wire telephone is hooked off or not. If the wire telephone is not hooked off, it is checked whether a given time has passed in a step 107. If the given time has not passed, the program goes to the step 103. But, if the wire telephone is hooked off, or if a given time has passed, the main controller 60 controls the line controller 10 by outputting the line control signal through the line control terminal Pc1 for canceling the holding state, and the MOH generator 20 by outputting the MOH control signal through the MOH control terminal Pc2 in order to stop the MOH in a step 108. That is, if the power is off while engaged in the call, the telephone line L is held on and the MOH is generated so that the user realizes the holding state of the telephone line L. Then, the user can continue the call through the wire telephone branched with the radio telephone.

As described hereinabove, in a radio telephone branched with a wire telephone, the present invention has an advantage that a telephone call may be maintained in spite of power failure during a engaged state in a call.

While the invention has been particularly shown and described with reference to the preferred embodiment of the present invention thereof, it will be understood by those skilled in the art that the foregoing and other changes in form and details may be made without departing from the spirit and scope of the present invention.

What is claimed is:

1. An apparatus for operating a radio telephone branched with a wire telephone by a common telephone line even when power failure of said radio telephone occurs, said radio telephone having a fixed means and a portable means, said fixed means being connected to said telephone line and connected to receive an ac voltage from a power supply source, said apparatus being housed in said fixed means and comprising:

line control means connected to the telephone line for interfacing an input/output signal through the telephone line and controlling connection of a telephone call;

signal generating means for generating a holding indication signal indicating a holding state of said telephone line;

a communication circuit for processing an input audio signal of said telephone line through said line control means, and outputting said holding indication signal generated from said signal generating means to said telephone line through said line control means and to a speaker during the holding state;

a radio communication circuit connected to said communication circuit for providing radio communication between said fixed means and said portable means of the radio telephone;

hook off sensing means for sensing hook-off of said wire telephone branched with said telephone line in response to a variation of a line voltage of said telephone line input through said line control means;

control means for controlling said line control means, said signal generating means and said radio communication circuit, to generate a holding state of said telephone line when sensing a given state of a first supply voltage and to cancel said holding state of said telephone line when sensing a given signal from said hook off sensing means;

supply voltage generating means for generating said first supply voltage by dropping said ac voltage into a dropped voltage and rectifying said dropped voltage;

rectifying means for generating a second supply voltage by rectifying said line voltage of said telephone line input through said line control means to said rectifying means;

first supply voltage control means for supplying said line control means, said signal generating means, said communication circuit, said hook off sensing means and said control means with one of said first supply voltage when power is received from said power supply source and said second supply voltage when power is not received from said power supply source; and second supply voltage control means for supplying said radio communication circuit with said first supply voltage.

2. A method of operating a radio telephone branched with a wire telephone by a telephone line even when power failure of said radio telephone occurs, said radio telephone having a fixed unit and a portable unit, said fixed unit being connected to said telephone line and connected to a power supply source, said method comprising the steps of:

checking for a loss of power from said power source while engaged in a call using said radio telephone;

placing said telephone line in a holding state and generating a signal indicating said holding state if said power is lost;

checking whether said power from said power source is on again while in said holding state;

transmitting power-off cancel data to said portable unit if power is on again while in said holding state, cancelling said holding state of said telephone line and stopping said signal indicating said holding state if a response signal in response to said power-off cancel data is received from said portable device, and then going to said step of checking for a loss of power;

checking whether said wire telephone is hooked off during a given time, if power is not on again or if said response signal is not received; and cancelling said holding state of said telephone line and stopping said signal indicating said holding state, if said wire telephone is hooked off or if said given time has elapsed.

3. A method as claimed in claim 2 further comprising:
transmitting said signal indicating said holding state to said telephone line and to a speaker of said fixed unit.

4. A method of operating a radio telephone having a fixed means powered by an external source and a portable means, and branched with a wire telephone by a telephone line, even when a power failure occurs, said method comprising:
determining whether said fixed means fails to receive ac power from said external power source while a user is engaged in a call
placing said telephone line in a holding state when said ac power is not received;
terminating said holding state if the wire telephone is placed in a hook-off state;
terminating said holding state if a given time has elapsed after said telephone line is placed in said holding state;
determining whether said fixed means is again receiving said ac power after said step of placing said telephone line in said holding state;
transmitting a power-off cancel signal to said portable means if said fixed means is again receiving said ac power;
determining whether said portable means transmits a response signal to said fixed means in response to said power-off signal.

5. The method as claimed in claim 4, further comprising the steps of:
generating a holding indication signal to indicate when said telephone is in a holding state;
terminating said holding state when said response signal is received by said fixed means;
terminating said holding indication signal when said holding state is terminated.

6. A a radio telephone having a fixed means and a portable means, said fixed means for operating the radio telephone branched with a wire telephone by a telephone line, said fixed means having a circuit for operating the radio telephone even when power failure from an ac power source occurs, said circuit comprising:
line control means connected to the telephone line for interfacing an input/output signal through the telephone line, for holding said telephone line in a holding state during said power failure, and for controlling connection of a telephone call to the circuit;
supply voltage generating means for generating a first supply voltage having one of a first and second state in dependence upon receipt of an alternating current voltage from said ac power source, said supply voltage generating means attenuating said alternating current voltage to an attenuated voltage and rectifying said attenuated voltage to generate said first supply voltage;
rectifying means for rectifying said line voltage on the telephone line to generate a second supply voltage, said rectifying means comprising:
a choke coil and a zener diode connected at a node, said choke coil and said zener diode being connected in series between said line control means and a ground terminal, said choke coil receiving said line voltage means, and
rectifier means connected in series between said node and said ground terminal, said rectifying means providing said second supply voltage;
control means for controlling said line control means; first supply voltage control means for alternatively supplying one of said first and second supply voltages to said line control means and said control means in dependence upon the state of said first supply voltage; and
second supply voltage control means for supplying said first supply voltage to said radio communication means.

7. The circuit as claimed in claim 6, further comprising:
communication means for processing said input/output signal of the telephone line through said line control means;
radio communication means connected to said communication means for communicating between the fixed means and the portable means by a radio signal;
hook off sensing means for sensing a hook off condition of the wire telephone in response to a variation of a line voltage on the telephone line to generate a hook off signal;
said control means for controlling said radio communication means; and
said first supply voltage control means alternatively supplying one of said first and second supply voltages to said communication means, said hook off sensing means and said control means in dependence upon the state of said first supply voltage.

8. The circuit as claimed in claim 7, wherein said control means controls said line control means and said radio communication means by generating a holding state when sensing said second state of said first supply voltage and terminating said holding state when said hook off signal is received.

9. The circuit as claimed in claim 8, further comprising:
signal generating means for generating a holding indication signal indicating said holding state of the telephone line and transmitting said holding indication signal to said communication means.

10. A circuit in a fixed means of a radio telephone also having a portable means, for operating the radio telephone branched with a wire telephone by a telephone line, even when power failure from an ac power source occurs, said circuit comprising:
line control means connected to the telephone line for interfacing an input/output signal through the telephone line, for holding said telephone line in a holding state during said power failure, and for controlling connection of a telephone call to the circuit;
communication means for processing said input/output signal of the telephone line through said line control means;
radio communication means connected to said communication means for communicating between the fixed means and the portable means by a radio signal;
hook off sensing means for sensing a hook off condition of the wire telephone in response to a variation of a line voltage on the telephone line to generate a hook off signal;
supply voltage generating means for generating a first supply voltage having a first or second state in dependence upon receipt of an alternating current voltage from said ac power source, said supply voltage generating means dropping said alternating current voltage to a dropped voltage and rectifying said dropped voltage to generate said first supply voltage;

rectifying means for rectifying said line voltage on the telephone line to generate a second supply voltage;

control means for controlling said line control means and said radio communication means;

first supply voltage control means for alternatively supplying one of said first and second supply voltages to said line control means, communication means, hook off sensing means and said control means in dependence upon the state of said first supply voltage;

second supply voltage control means for supplying said first supply voltage to said radio communication means.

11. The circuit as claimed in claim 10, wherein second control means controls said line control means and said radio communication means by generating a holding state when sensing said second state of said first supply voltage and terminating said holding state when said hook off signal is received.

12. The circuit as claimed in claim 11, further comprising:

signal generating means for generating a holding indication signal indicating said holding state of the telephone line and transmitting said holding indication signal to said communication means.

13. The circuit as claimed in claim 12, wherein said second supply voltage control means supplies said first supply voltage to said radio communication means when said first supply voltage has said first state.

14. The circuit as claimed in claim 12, wherein said hook off sensing means comprises:

capacitor means for storing charge of said line voltage;

first transistor means connected to said telephone line and said capacitor means for transmitting said stored charge; and second transistor means for transmitting said second supply voltage in dependence upon receipt of said stored charge.

15. The circuit as claimed in claim 12, wherein said first supply voltage control means comprises a diode.

16. The circuit as claimed in claim 12, further comprising speaker means for broadcasting a holding indication message in response to said holding indication signal.

17. The circuit as claimed in claim 12, wherein said first supply voltage control means alternatively supplies one of said first and second supply voltages to said signal generating means in dependence upon said state of said first supply voltage.

18. The circuit as claimed in claim 17, wherein said second supply voltage control means supplies said first supply voltage to said radio communication means when said first supply voltage has said first state.

19. The circuit as claimed in claim 18, wherein said second supply voltage control means comprises:

a first transistor with a collector connected to said first supply voltage and to a first end of a resistor and a base connected to a second end of said resistor;

a capacitor coupled between said second end of said resistor and to a reference voltage.

20. The circuit as claimed in claim 12, wherein said supply voltage generating means comprises:

power supply reception means for receiving said alternating current voltage;

induction means for attenuating an amplitude level of said alternating current voltage to generate said dropped voltage; and regulator means for rectifying said dropped voltage.

21. The circuit as claimed in claim 20, wherein said rectifying means comprises:

choke coil means for cutting off an alternating current component of said line voltage to generate a cut off signal;

rectifier for rectifying said cut off signal to generate said second supply voltage;

regulation means for maintaining said second supply voltage.

22. The circuit as claimed in claim 21, wherein said hook off sensing means comprises:

capacitor means for storing charge of said line voltage;

first transistor means connected to said telephone line and said capacitor means for transmitting said stored charge;

second transistor means for transmitting said second supply voltage in dependence upon receipt of said stored charge.

* * * * *

UNITED STATES PATENT AND TRADEMARK OFFICE
CERTIFICATE OF CORRECTION

PATENT NO. : 5,400,388
DATED : 21 March 1995
INVENTOR(S) : Joo-Won Heo

It is certified that error appears in the above-indentified patent and that said Letters Patent is hereby corrected as shown below:

| | | |
|---|---|---|
| Column 2, | Line 51, | after "checking" insert -- hook --; |
| Column 3, | Line 28, | after "from" insert --a--; |
| Column 3, | Line 30, | before "controller" insert --line--; |
| Column 3, | Line 62, | after "during" delete "on": |

Signed and Sealed this

Sixteenth Day of September, 1997

Attest:

BRUCE LEHMAN

*Attesting Officer*  *Commissioner of Patents and Trademarks*